Patented Feb. 13, 1945

2,369,189

UNITED STATES PATENT OFFICE 2,369,189

GLASS ANNEALING AND METHOD

Edgar D. Tillyer, Southbridge, Mass., and James W. Ford, Snyder, N. Y., assignors to American Optical Company, Southbridge, Mass., a voluntary association of Massachusetts No Drawing. Application June 30, 1942, Serial No. 449,170

3 Claims. (Cl. 49—89)

This invention relates to glass annealing and has particular reference to a novel and simplified method of determining when the annealing of a particular composition of glass has been sufficiently obtained.

One of the principal objects of the invention is to provide a novel method of determining the accuracy of annealing of different glass batches by utilizing samples from a single melt of approximately the same composition whose maximum refractive index has been determined, as indicators during the annealing of said different glass batches.

Another object of the invention is greatly to reduce the time, effort and cost of determining when a particular batch or group of articles formed of said batch of glass are sufficiently annealed.

Another object is to provide a plurality of check samples of a particular glass composition which may be used as gauge means for determining the accuracy of annealing of subsequent batches of similar glass compositions.

Another object of the invention is to provide a novel method of determining when glass of a particular composition has reached its stage of substantially complete compacting whereby the greatest possible homogeneity has been obtained with the result that an article formed of such glass and having been properly annealed will more accurately perform its optical function and will remain stable as to said function.

Another object is to provide a novel method of determining the extent to which the glass has been compacted.

It has often been assumed, in the past, that the criterion of a well annealed glass is the absence of strain as determined by the use of polarized light. It has been found, however, that although freedom from strain does indicate a certain amount of annealing this is not a criterion of the highest type of annealing. Glass indicated as being free from strain in many instances has been found to be insufficiently annealed so as to render it impractical for use in forming the optical elements of precision instruments. It has often been assumed that existing errors in optical elements, which indicate freedom from strain, were due to non-homogeneity of the glass batch but such errors have been definitely found to be due to the absence of complete compacting of the glass as results from improper annealing.

It is a well established fact that when a glass of a particular composition is completely compacted it has reached its maximum index of refraction. The index, however, for glasses of a particular composition but of different batches will vary from one batch to another. This is due to the fact that slight variations in the composition are introduced during the forming of the glass since the materials can not be weighed out with sufficient accuracy to obtain identical melts in the forming of subsequent batches. It has been found, however, that the chemical variation in the glass composition from one batch to another, although resulting in a variation of index of refraction, has little effect as to the required annealing schedule of temperatures and times so that the schedule of annealing temperatures for one batch will hold for subsequent batches of similar compositions providing that the temperature during the annealing is uniform throughout the annealing furnace. Very elaborate attempts, however, have been made to obtain uniformity of temperature throughout the furnace but such uniformity is not always possible. The result, therefore, is that the annealing temperature in one part of the furnace may be of the required degree and in another part of the furnace may be different.

All previously known methods of checking the annealing of glass are extremely complex and expensive as they not only require the use of expensive and intricate apparatus but each step of the process of annealing and determining the result of said annealing must be carefully and accurately performed by exceptionally skilled individuals in order to obtain the most accurate results, such results being the obtaining of maximum compacting and maximum index of refraction of the glass for high precision use or for obtaining sufficient compacting for specific uses not requiring such extreme accuracy.

It, therefore, is one of the primary objects of this invention to overcome, to a major extent, all the difficulties set forth above by providing simple, efficient and economical means and method of determining when different batches of glass of approximately the same composition are properly annealed.

In following the teachings of the invention glass similar in composition to the glass desired for use in forming various different optical elements is first selected. A block of this glass is cut to produce several pieces of desired size and one or more of these pieces is carefully compacted by any known process or by the following method:

A small laboratory furnace, the temperature of which can be accurately controlled, is set up and the said pieces of glass are put into the furnace and annealed by some laboratory annealing schedule. The glass is then removed from the furnace and its index of refraction is measured. It is put back into the furnace and held at a somewhat lower temperature for a week or two. It is then removed from the furnace and its index of refraction again measured. It is to be understood that suitable records of said measurements are maintained. If the index has risen, as it probably will if the original annealing schedules were not correct, it is put back into the furnace at approximately 50° F. lower than in the preceding heating operation for an additional week or two. This procedure is continued until the index no longer rises and the maximum index of refraction has been obtained. This maximum index of refraction is carefully recorded and a plurality of test samples is produced from the original block of glass from which the sample pieces of glass were selected. These pieces of glass are maintained as standard test specimens for this particular composition and are used in determining the annealing of subsequent batches of similar compositions and may be used over and over again. After once having determined the maximum index of refraction, it is immaterial whether the test samples are annealed or unannealed when they are subsequently put to use. In carrying out the annealing of subsequent compositions these test samples are placed or scattered throughout the furnace in which pieces of a subsequent glass batch have been placed for annealing or in which various articles formed of said glass have been placed for annealing. One or more of said test samples are preferably directly associated with the respective pieces of glass or articles to be annealed at different locations in the furnace.

The annealing schedule for said particular glass composition is then carried out. When the schedule of annealing has been completed the test samples are removed and checked as to their existing index of refraction. If the index of refraction of the samples are of the maximum index determined by the initial annealing of similar samples it is immediately known that the glass of the particular batch which is being annealed or the articles of said glass composition have reached their maximum annealing.

If, however, it is found that the index of refraction of the test samples have not reached their maximum index then the annealing is not complete. The batch must therefore be reannealed or that part of the batch in which the index deficiencies are found must be reannealed. This, of course, depends upon whether or not the index of refraction of the test samples are too far removed from the maximum index of refraction to render the glass being annealed impractical for use. It is to be understood that although the maximum index of refraction is not initially reached it may be sufficiently accurate for some specific uses to which the glass or articles are to be put and the test samples therefore will enable this determination. It is to be understood that even though some of the test samples which have been related with particular pieces of glass at given locations in the furnace have not reached their maximum index of refraction during said annealing others may have reached their maximum index and the glass, therefore, with which said latter samples are associated would be properly annealed and would not require reannealing.

The test samples, as has been previously mentioned above, may be annealed or unannealed when they are associated with the pieces of glass or articles to be annealed in the furnace. This is because the batch must be heated to a sufficient temperature to remove the strain rapidly. The glass of these test samples, when the batch is heated, will initially become uncompacted and be greatly lowered as to index of refraction and will only become compacted when the said batch and test samples have gone through the complete annealing schedule. When removed from the furnace and tested as to index of refraction the said test sample will provide a key to determining the quality of annealing of the glass under treatment and whether or not the said glass is of sufficient quality for its intended use.

If it is desired simultaneously to anneal two or more batches of glass of different compositions which require a somewhat similar annealing schedule, test samples of said particular glasses of different compositions are used in a manner similar to that set forth above for a single glass, it being only essential to initially obtain test samples for each of the particular different glass compositions.

For example, let us assume that it is desired to anneal a roof prism of a given glass composition. Test samples of the same glass composition are selected from previously made test samples. The roof prisms of a similar composition are placed in an annealing furnace. One or more test samples are related with the roof prism or prisms at different locations throughout the furnace. The annealing schedule is then carried out and in order to determine whether or not the glass compositions of the roof prism or prisms have been properly annealed the test samples are removed and checked to determine if they have reached their maximum index of refraction or how much they depart therefrom. In this particular case, the test samples must be within a few units of the 4th decimal place of their predetermined maximum index of refraction. At the completion of the annealing, if certain of the test samples are not sufficiently close to the maximum index of refraction, then the particular pieces with which they are associated must be reannealed.

Let us assume that we are to anneal a piece of glass for use in making an eye piece of a less precise instrument. This does not have to be anywhere near as well annealed as the roof prisms. The distribution of the samples for the annealing operation is carried through in a manner similar to that for the roof prisms but a different predetermined annealing schedule is used. The standard test samples which have been associated with the eyepiece blanks during said annealing schedule are measured for index as above described. If their index is found to be within a 5 to 15 in the 4th place of decimals of the maximum for the test sample the annealing is considered satisfactory. The test samples, therefore, provide positive gauge means for determining the efficiency of the annealing.

From the foregoing description it will be seen that simple, efficient and economical means and methods have been provided for accomplishing all of the objects and advantages of the invention.

Having described our invention, we claim:

1. The method of determining the degree of anneal or compacting of a piece of glass of a known composition comprising subjecting said piece of glass and a test piece of glass of substantially the same composition but of a known maximum index of refraction when completely annealed or compacted to an annealing cycle, determining the index of refraction of said test piece after passing through said annealing cycle to determine its degree of anneal or compacting by comparing the index of refraction of the test piece, at the completion of the annealing cycle, with the known maximum to thereby determine the degree of anneal of the piece.

2. The method of determining the degree of anneal or compacting of a plurality of pieces of glass of a known composition comprising subjecting said plurality of pieces of glass and an associated test piece of glass of substantially the same composition but of a known maximum index of refraction when completely annealed or compacted to an annealing cycle, determining the index of refraction of said test piece after passing through said annealing cycle to determine its degree of anneal or compacting by comparing the index of refraction of the test piece, at the completion of the annealing cycle, with the known maximum to thereby determine the degree of anneal of said plurality of pieces.

3. The method of determining the degree of anneal or compacting of several groups of pieces of glass of a known composition comprising subjecting said several groups of pieces with each of said respective groups having associated therewith a test piece of glass of substantially the same composition but of a known maximum index of refraction when completely annealed or compacted simultaneously to an annealing cycle, determining the index of refraction of the test piece of each respective group after passing through said annealing cycle to determine its degree of anneal or compacting by comparing the index of refraction of the test piece, at the completion of the annealing cycle, with the known maximum to thereby determine the degree of anneal of the respective groups of pieces.

EDGAR D. TILLYER.
JAMES W. FORD.